United States Patent [19]

Schroeder

[11] Patent Number: 5,713,444
[45] Date of Patent: Feb. 3, 1998

[54] ELECTROMAGNETIC BRAKE/CLUTCH

[76] Inventor: Karl S. Schroeder, 6822 Salem Ave., Clayton, Ohio 45315

[21] Appl. No.: 688,249
[22] Filed: Jul. 29, 1996

Related U.S. Application Data

[60] Provisional application No. 60/003,913, Sep. 18, 1995.
[51] Int. Cl.⁶ ........................................................ F16D 37/02
[52] U.S. Cl. ........................................ 192/21.5; 188/267
[58] Field of Search ................................ 192/21.5, 84.1, 192/84.31, 84.93; 188/267; 464/29

[56] References Cited

U.S. PATENT DOCUMENTS

| | | | |
|---|---|---|---|
| 2,605,876 | 8/1952 | Becker | 192/21.5 |
| 2,631,705 | 3/1953 | Winther | 192/21.5 |
| 2,725,133 | 11/1955 | Winther | 192/21.5 |
| 2,748,911 | 6/1956 | Stahl | 192/21.5 |
| 3,315,134 | 4/1967 | Scholl | 192/21.5 X |
| 5,054,593 | 10/1991 | Carlson | 192/21.5 |

Primary Examiner—Rodney H. Bonck
Attorney, Agent, or Firm—William Weigl

[57] ABSTRACT

Tapering shallow notches are provided in the surface of a rotor of a magnetic brake or clutch to increase the torque-transmitting effect of the unit as compared to a conventional smooth torque-transmitting surface. The notches taper decreasingly toward the torque-transmitting surface in the direction opposite to the direction of rotation of the rotor.

4 Claims, 2 Drawing Sheets

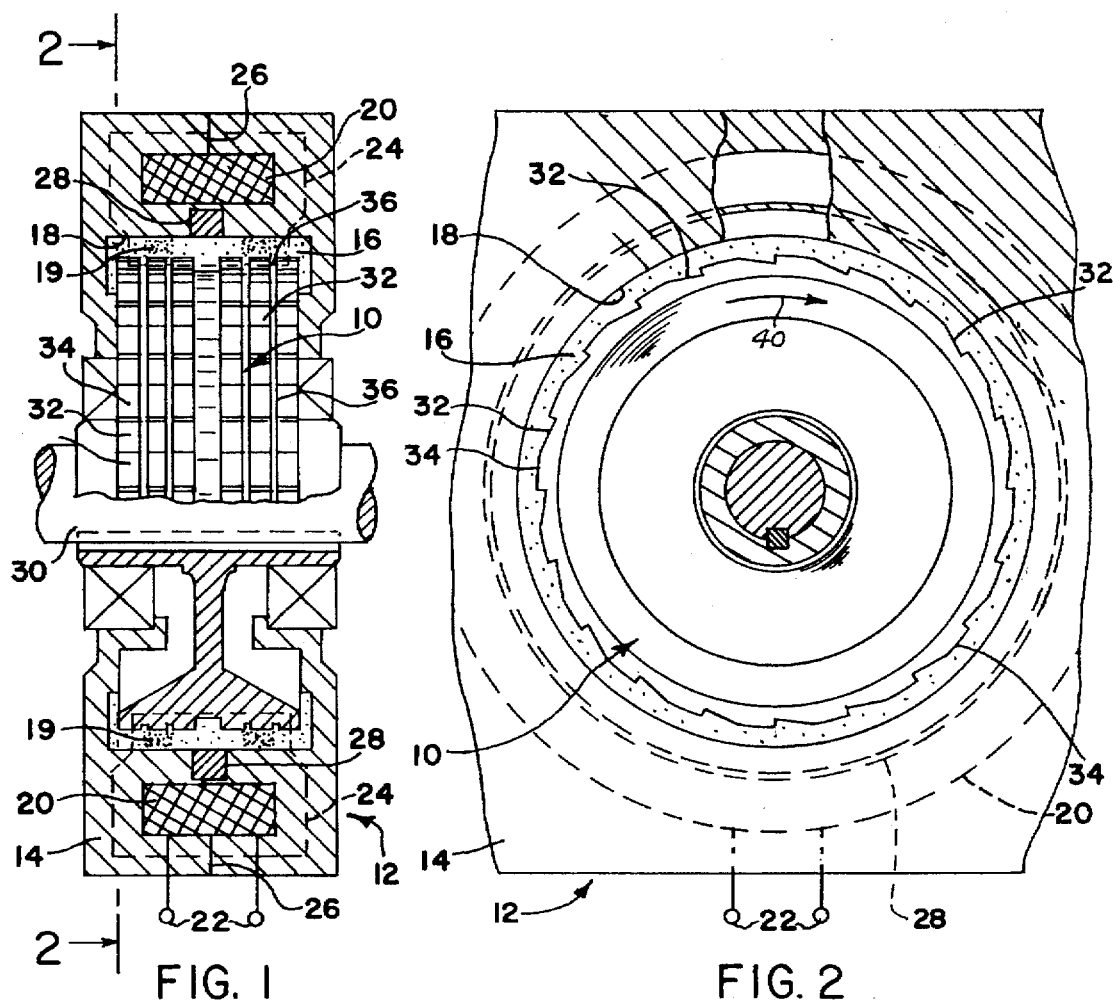
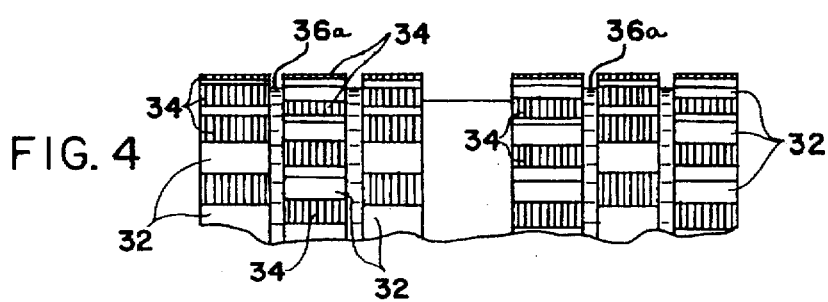

FIG. 3
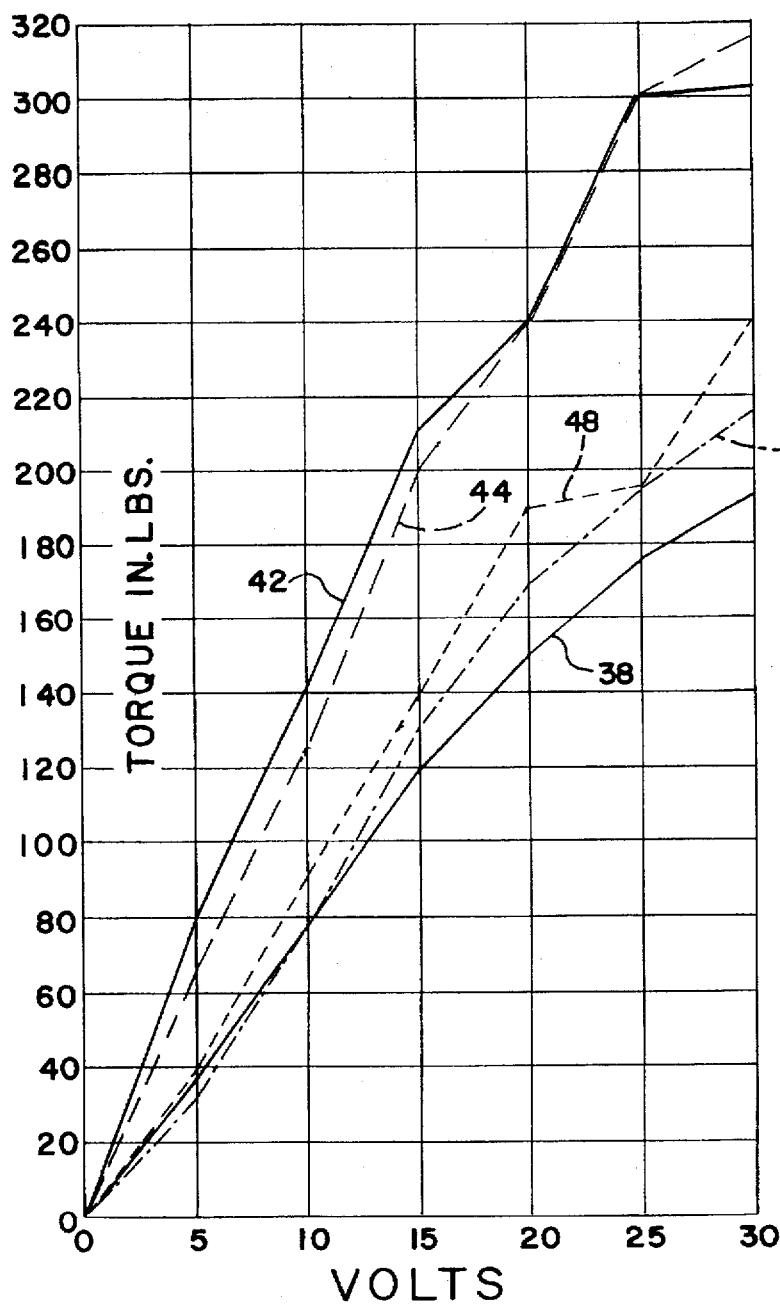
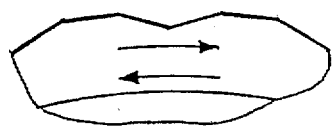
FIG. 5
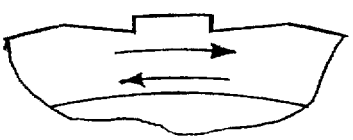
FIG. 6

ELECTROMAGNETIC BRAKE/CLUTCH

This invention relates generally to magnetic particle brake and clutch devices, and in particular to an improvement in such a device for providing enhanced torque characteristics and capabilities. This application is a regular utility application based on my filing of U. S. Provisional patent application, Ser. No. 60/003,913, on Sep. 18, 1995.

BACKGROUND OF THE INVENTION

Torque and force transmission devices using magnetic particles under the influence of a magnetic flux path for coupling a rotor to a brake or clutch element have been known since at least as early as the issuance of U. S. Pat. NO. 2,575,380 granted in 1951 to Jacob Rabinow. The particles are typically made from a ferrous material such as an aluminum-chrome alloy having resistance to heat deterioration to which brakes and clutches are subjected. When responding to a flux path from an applied electromagnetic field, the magnetized particles bind together in a chain-like configuration, connecting the rotor to a stationary surface in the case of a brake or to a driven element in the case of a clutch. Such brakes and clutches are employed in a large variety of well-known force transmission applications.

The typical magnetic brake includes a rotor having a driven braking surface in either drum or disk form, a closely spaced stationary stator surface and magnetic particles filling the space between the two braking surfaces. A variable field coil applies direct current magnetic flux to the particles, rotor and stator to cause the closely-spaced surfaces of the rotor and stator to brake the rotor via the particles. Although exceptions are known in the art, the usual braking surfaces are relatively smooth, although the surface of a drum may be circumferentially grooved. Several patents discuss the provision of variously-configured ribs on drum or disc surfaces (e.g., U.S. Pat. No. 2,734,603), circumferentially tapered disc segments (U.S. Pat. No. 2,813,606), grooves or notches (U.S. Pat. No. 2,605,876) and interdigitated, staggered magnetic poles (2,631,705).

SUMMARY OF THE INVENTION

The braking or clutching surface of a rotor is provided with short-length shallow notches which taper decreasingly in a direction opposite to the direction of rotation of the rotor. The opposing stator surface is smooth, as is conventional. A plurality of notches are spaced circumferentially about the rotor surface, providing alternating notches and a torque-transmitting surface in the form of lands. Compared to a standard smooth surface, torque transmission may be as much as doubled at lower voltages, and is increased about 60 to 66 percent at higher voltage ranges. This allows the device to be smaller to obtain the same torque transmission or enables greater torque to be achieved for a given size unit.

The principal object of the invention is to provide for increased torque output of an electromagnetic brake or clutch by providing a novel configuration to the rotor surface.

An ancillary object is to provide such a rotor surface which is appropriately configured in relation to the rotational direction of the rotor.

Other objects and advantages will become apparent from the following description, in which reference is made to the accompanying drawings.

DESCRIPTION OF THE DRAWINGS

FIG. 1 is a fragmentary cross-sectional view of one type of magnetic particle brake having a unidirectional rotor incorporating the improvement of my invention.

FIG. 2 is a view of the brake of FIG. 1 taken essentially along lines 2—2 of FIG. 1, some parts being exaggerated for purposes of emphasis.

FIG. 3 is a chart illustrating static torque test measurements that were made for comparing the device having the improved rotor of FIGS. 1 and 2 to the identical conventional device prior to improving the rotor surface.

FIG. 4 is a modified version of the invention enabling the rotor to be driven in either direction.

FIG. 5 illustrates an enlarged side view of another rotor surface having modified notches enabling the rotor to be driven bidirectionally.

FIG. 6 is a view similar to FIG. 6 of still another notch modification for use with a bidirectional rotor.

DESCRIPTION OF THE PREFERRED EMBODIMENTS

FIGS. 1 and 2 are full-size cross-sectional and side views respectively of a conventional magnetic particle brake rotor 10 in a braking unit environment, with one main embodiment of the improvement being illustrated. Since it is common to use the electromagnetic principles disclosed herein for both brakes and clutches, I will describe my improvements only in connection with a brake 12. It can be readily appreciated by those skilled in the art how to modify the structure to achieve a clutching action instead of a braking.

The braking unit which I modified and torque-tested was a Horton model MPB-100, sold by Horton Manufacturing Co., Inc. of Minneapolis, Minn. Its rotor and stator or braking surfaces were both machined to be relatively smooth. As depicted herein, everything shown (with the exceptions of the outer peripheral surface of the rotor 10 and the showing herein of a stationary part of the brake 14 as one piece instead of two), is essentially the same as illustrated in a Horton catalog. Its air gap 16 is approximately 0.015 inches between the outer surface of the rotor 10 and an inner braking surface 18. That air gap is essentially filled with powder granules or particles 19 which are produced from an alloy of iron, aluminum and chrome. The powder particles are of spherical design to provide high heat resistance with minimal disintegration. As is commonly understood, when magnetized, the particles bind together in a chain-like configuration, connecting the rotor 10 to the stationary brake 14. To magnetize the particles, an annular field coil 20 is connected to an electrical D.C. power input 22. When energized under a suitable variable voltage control (not shown), the coil 20 creates a magnetic flux path illustrated by the dotted lines 24 shown at the top and bottom of FIG. 1. Coil 20 is mounted in a groove machined between two halves of the brake 14 at a parting line 26. To illustrate the effect of the flux path 24 on the particles 19, they are shown packed in four locations in FIG. 1 where the flux path bridges between the surface 18 of the brake 14 and the outer peripheral surface of the rotor 10. A non-magnetic barrier ring 28 which is coaxial with the field coil 20 is provided to assure proper creation of the flux path.

The rotor is keyed to a shaft 30 which is typically a driven shaft in the case of a brake, or a drive shaft in the case of a clutch. In a clutching situation, the surface 18 would be part of a driven element. Only a brake unit will be described in this application for simplification.

Referring now to my improvements, I have shown in slightly exaggerated fashion grooves or notches 32 which are machined parallel to the axis of shaft 30 at the outer periphery of the rotor 10. In a three-and-one-half inch diameter rotor, I have produced twenty notches 32, each one being 0.025 inches in circumferential length. Between each adjacent pair of notches, a land 34 exists, these lands being the actual circular surface of the rotor 10 prior to producing the notches 32. I have found a notch depth of 0.020 inches to work very satisfactorily. The notch depth, their number, precise shape and spacing are all subject to experimentation to achieve the desired torque effect. Narrow shallow circumferential grooves 36 separate each side half of the rotor into three narrow bands, this being its form in the design of the Horton unit which was modified. Whether the grooves 36 have any significance on the improved torque characteristics achieved from the modifications is uncertain at this stage, since no rotor has been made or tested without the grooves 36. From the illustration of the unit in the Horton catalog, however, it appears that the particles pack across adjacent rotor bands and grooves 36, and it is thus assumed that the effects of the grooves 36 are the same in both the standard and modified versions of rotor.

The results of preliminary tests are shown in FIG. 3, a chart depicting five static torque measurements in five volt increments over a range of thirty volts. Solid line 38 illustrates the torque developed by the Horton unit mentioned previously, i.e., the one modified, but prior to its modification. In the catalog, its torque is rated up to one hundred four inch pounds (in. lbs.). In actuality, it developed one hundred ninety in. lbs. After notches 32 were made in the surface of the rotor 10, two tests were conducted with the rotor 10 turned clockwise as shown by arrow 40 of FIG. 2, and two tests were conducted with the rotor 10 turned counterclockwise. The tests which were run clockwise are depicted by solid line 42 and dash line 44. It will be noted that they track fairly closely at each five volt increment, producing between 65–100 percent increase in torque at the five volt level, and 71 percent torque increase at the twenty-five volt level. Thus, a significant torque capability of a magnetic brake was found to be present when the depth of the notches 32 decreased in a direction opposite to the direction of rotor rotation as shown by arrow 40.

Note also that when the rotor was torque-tested in a counterclockwise direction (opposite the arrow 40 of FIG. 2), it tracked very closely with the standard unit up to about fifteen volts, then increased slightly up to the thirty volt level. The two tests conducted in the counterclockwise direction are depicted by the dot-dash line 46 and the dotted line 48 of FIG. 3. The notches 32, when the rotor is driven in the direction in which the notch depth increases in a direction opposite to rotor direction, shows some slight but less significant torque characteristic improvement.

It is surmised that a unidirectional rotor with maximum notch and land surfaces as shown in FIG. 2 would provide the greatest torque improvement. But there are instances in which it is necessary or desirable to drive the motor in either direction. FIGS. 4–6 illustrate variations in the invention which can be expected to provide some measure of torque improvement in both directions. In FIG. 4, bands on opposite sides of the grooves 36a have their notches tapered in opposite directions. With six bands as shown, three alternate bands will have their notches extending in opposite directions. Obviously, all bands could not be machined together unless each band was a separate disc, and the discs were stacked during machining and then stacked alternately at assembly.

FIGS. 5 and 6 illustrate other notch modifications which are in the realm of being obvious to try, but as of this juncture, they have not been produced or tested. Both Figures illustrate a fragmentary portion of a rotor, FIG. 5 showing a notch having its deepest part centrally and tapering outwardly toward each adjacent land and FIG. 6 showing notches tapering in opposite directions on each side of a land 34. Arrows showing the capability of driving the rotors of FIGS. 5 and 6 bidirectionally are shown with each Figure.

Various other changes may be made without departing from the spirit and scope of the claims. While the only rotor produced and tested had the outer periphery of a drum-style rotor notched, it is within the scope of this invention to possibly achieve the same or nearly the same torque advantages where the rotor is a disk and the ends or sides of the disks are notched radially. Additionally, both the periphery and sides of a drum or disc may be provided with the improved notched surface to further enhance the torque capability. Further, while notches 32 have been machined parallel to the rotor 10 axis, it is assumed they may also be angular with respect to the shaft 30 to some extent. In all instances, the rotor and brake or driven element of a clutch are conventionally made of magnetizable ferrous materials.

Having described my invention, I claim:

1. In a torque transmitting device comprising a rotatable magnetizable rotor element having a torque-transmitting surface, means for unidirectionally driving said rotor element, a second magnetizable element having a relatively smooth uninterrupted torque-receiving surface selectively connectable to said rotor element and closely spaced relatively thereto, a mass of relatively movable contiguous discrete ferromagnetic powder particles in the space between the elements, an electric coil for subjecting said elements and particles to a magnetic flux field of sufficient intensity to cause attraction between the particles and both said elements and a coupling of said elements through said particles, and means supplying a variable direct current to create said flux, the improvement comprising:

said rotor having a surface configuration comprising a plurality of short-length shallow notches below said surface, said notches tapering decreasingly toward and merging with said rotor surface in a direction opposite to the direction of rotation of said rotor whereby to enhance torque transmission when said particles and elements are subjected to said magnetic flux.

2. The invention set forth in claim 1 wherein said second element is stationary and comprises a portion of a brake.

3. The invention set forth in claim 1 wherein said torque-transmitting surface is the outer peripheral surface of a drum-style rotor, and wherein said tapered notches extend generally parallel to the axis of rotation of said rotor.

4. The invention set forth in claim 3 wherein at least one peripheral groove extending three hundred sixty degrees about the outer surface of said rotor separates said outer surface into side-by-side torque-transmitting surfaces.

* * * * *